US005564172A

United States Patent [19]

Klann

[11] Patent Number: 5,564,172

[45] **Date of Patent: * Oct. 15, 1996**

[54] SPRING TIGHTENER

[76] Inventor: Horst Klann, Terra Wohnpark 12, D 7730 Villingen-Schwenningen 24, BRD, Germany

[ * ] Notice: The portion of the term of this patent subsequent to Mar. 7, 2006, has been disclaimed.

[21] Appl. No.: 467,324

[22] Filed: Jan. 18, 1990

Related U.S. Application Data

[63] Continuation of Ser. No. 201,056, Jun. 1, 1988, abandoned.

[30] Foreign Application Priority Data

Jun. 16, 1987 [DE] Germany ............................ 8708476 U

[51] Int. Cl.[6] ........................................ B23P 19/04

[52] U.S. Cl. ................................ 29/227; 254/10.5

[58] Field of Search ..................... 29/227; 254/10.5

[56] References Cited

U.S. PATENT DOCUMENTS 3,747,895 7/1973 Martin ........................................ 29/227

4,527,782 7/1985 Klann ........................................ 267/177

4,541,614 9/1985 Klann ........................................ 29/227

4,809,951 3/1989 Klann ........................................ 254/10.5

FOREIGN PATENT DOCUMENTS

8626909 U 1/1987 Germany .

*Primary Examiner*—Bruce M. Kisliuk

*Attorney, Agent, or Firm*—McGlew and Tuttle, P.C.

[57] ABSTRACT

A spring tightener includes a central tube assembly which includes a cylindrical guide tube having a lower end with a seat bushing having an axial thrust bearing in which a flange ring at the lower end of a threaded spindle is positioned for securing and rotatably supporting the spindle. A coupling tube is telescopically movable in the guide tube and the device includes a cam engageable with a slot of an adjacent tube for the positive locking guidance of these tubes. A threaded tube is connected to the outer end of the coupling tube and it is internally threaded and in threaded engagement with a spindle which is journalled in the seat bushing of the guide tube. A first pressure plate is provided with recesses which engage against outwardly extending radial fingers of the threaded tube and a second pressure plate is mounted over the cylindrical guide tube and bears against a bearing surface at the lower end of the guide tube.

10 Claims, 2 Drawing Sheets

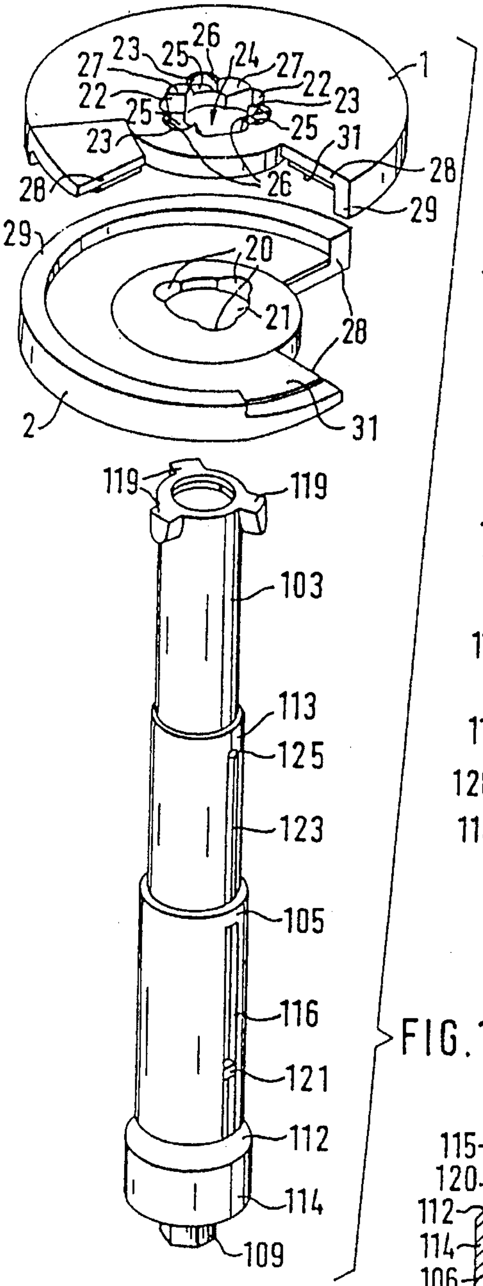
FIG. 1
FIG. 2
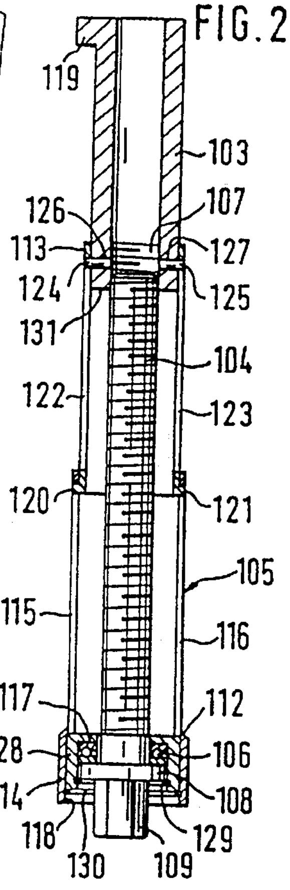
FIG. 3
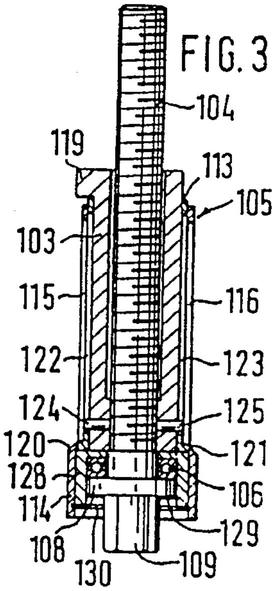
FIG. 7
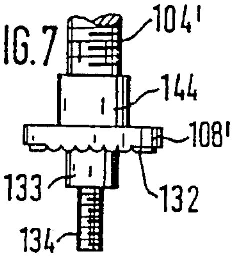
FIG. 4
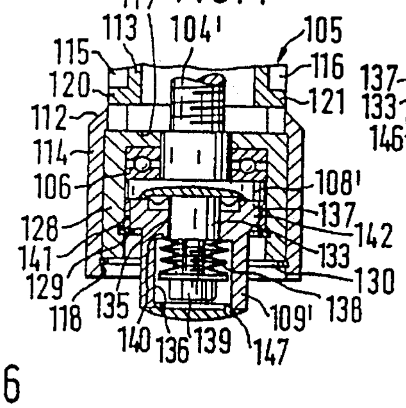
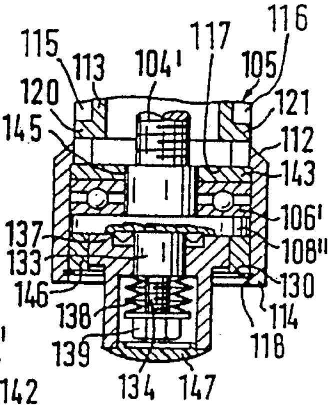
FIG. 5
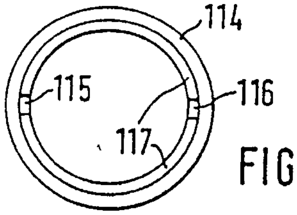
FIG. 6

SPRING TIGHTENER

This is a file wrapper continuation Application of application Ser. No. 201,056 filed Jun. 1, 1988, now abandoned.

FIELD AND BACKGROUND OF THE INVENTION

This invention relates in general to spring tighteners and in particular to a new and useful spring tightener for large coil springs especially for motor vehicle axle springs and which includes a telescopic arrangement of the guide tubes for the spring pressure plates.

The invention particularly refers to a spring tightener for large coil springs, especially for motor vehicle axle springs. The device includes two loose, dishlike pressure plates, each with a central insertion opening. The device includes a threaded spindle having a spindle head with key profile, which is mounted by means of an axial thrust bearing revolvingly in a cylindrical guide tube. The bearing is provided with a radial bearing surface to support the pressure plate at the spindle head. Also, cylindrical threaded tube, having an internal threading to screw in the threaded spindle, is firmly joined to and able to move coaxially with the guide tube by a positive-locking guideway and a coupling tube which is provided with a terminal segment having radial fingers about the periphery of the end away from the spindle head. By the engagement of the tube in recesses of the pressure plate away from the spindle head the threaded tube can be brought into a rigid tension coupling with this pressure plate.

In a familiar spring tightener of this kind (German GM 88 26 909.7), the guide tube is joined to the threaded tube by an axially movable multicornered tube with a broken outer rim, such that the threaded tube can telescope into the multicornered tube and the multicornered tube can telescope into the guide tube. The threaded tube can be moved lengthwise in the multicornered tube by means of a suitable multicornered head arranged at the end near the spindle head. The guide tube is provided with an inner multicornered profile at the end away from the spindle head, in which the multicornered tube can be moved lengthwise. Furthermore, at the ends of the multicornered tube and the guide tube away from the spindle head there are snap rings arranged in ring grooves, which serve as axial stops for the multicornered head of the threaded tube and for a head piece at the end of the multicornered tube near the spindle head. In addition, the end of the threaded spindle away from the spindle head is fashioned as a safety ring, and a ring-shaped bearing surface is formed inside the threaded tube by an inwardly projecting interior threading, which forms a stop for the safety ring of the threaded tube in the extended position of the latter. In practice, it has been found that the fabrication of such spring tightener demands relatively high production costs, on account of the multicornered profile that must be used for the torsion protection, and that the interpenetrating tubes are so weakened by the ring grooves necessary to accommodate the snap rings that there is a danger of fracture, given the desire to make the walls as thin as possible.

SUMMARY OF THE INVENTION

The invention provides a construction of spring tightener without the known drawbacks and of a compact construction with slight wall thickness of both the guide tube and the coupling tube. It is possible to dispense not only with the cost-intensive multicornered profile as a torsion protecting element, but also with the snap rings accommodated in ring grooves, serving as axial lengthwise stops for the interconnected tubes.

According to the invention, the guide tube is provided with at least one axial guide slot, closed at the tube end away from the spindle head, in which is inserted a guide cam arranged at the end segment of the coupling tube near the spindle head. The coupling tube is provided with at least one guide slot, closed at both ends of the coupling tube. A guide pin is inserted in the tube and secured at the terminal segment of the threaded tube near the spindle head.

The torque safety clutch construction of the invention prevents overloading of the threaded spindle with adequate reliability and therefore also tends to diminish further the chance of accidents.

Accordingly, it is an object of the invention to provide a spring tightener for coil springs which includes a guide tube for the pressure plates of the tightener which has a cylindrical guide tube portion, a coupling tube portion which is telescopic in respect to the cylindrical guide tube portion and an internally threaded tube portion which is secured to the outer end of the coupling tube portion, the arrangement being such that a spindle which is threaded into threaded tube may permit the collapsing or extensible movement between pressure plates which engage a spring for handling.

A further object of the invention is to provide a spring tightener which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the drawings:

FIG. 1 is an exploded perspective view of spring tightener constructed in accordance with the invention;

FIG. 2 is an axial sectional view of the spring tightener of FIG. 1 in the condition of its extended length without the pressure plates;

FIG. 3 is an axial sectional view of the spring tightener of FIGS. 1 and 2 in the condition of its shortest length without the pressure plates;

FIG. 4 is an enlarged axial sectional view of a segment of the spring tightener at the spindle head, with a torque safety clutch between a key-profile head and the threaded spindle;

FIG. 5 is a view similar to FIG. 4 of a seating of the spindle head in the seat bushing of the guide tube of another embodiment of the invention;

FIG. 6 is a front end view of the seat bushing of the empty guide tube; and

FIG. 7 is an elevation of a terminal segment of the threaded spindle head in the configuration of FIGS. 4 and 5.

GENERAL DESCRIPTION OF THE PREFERRED EMBODIMENTS

Figure 8:
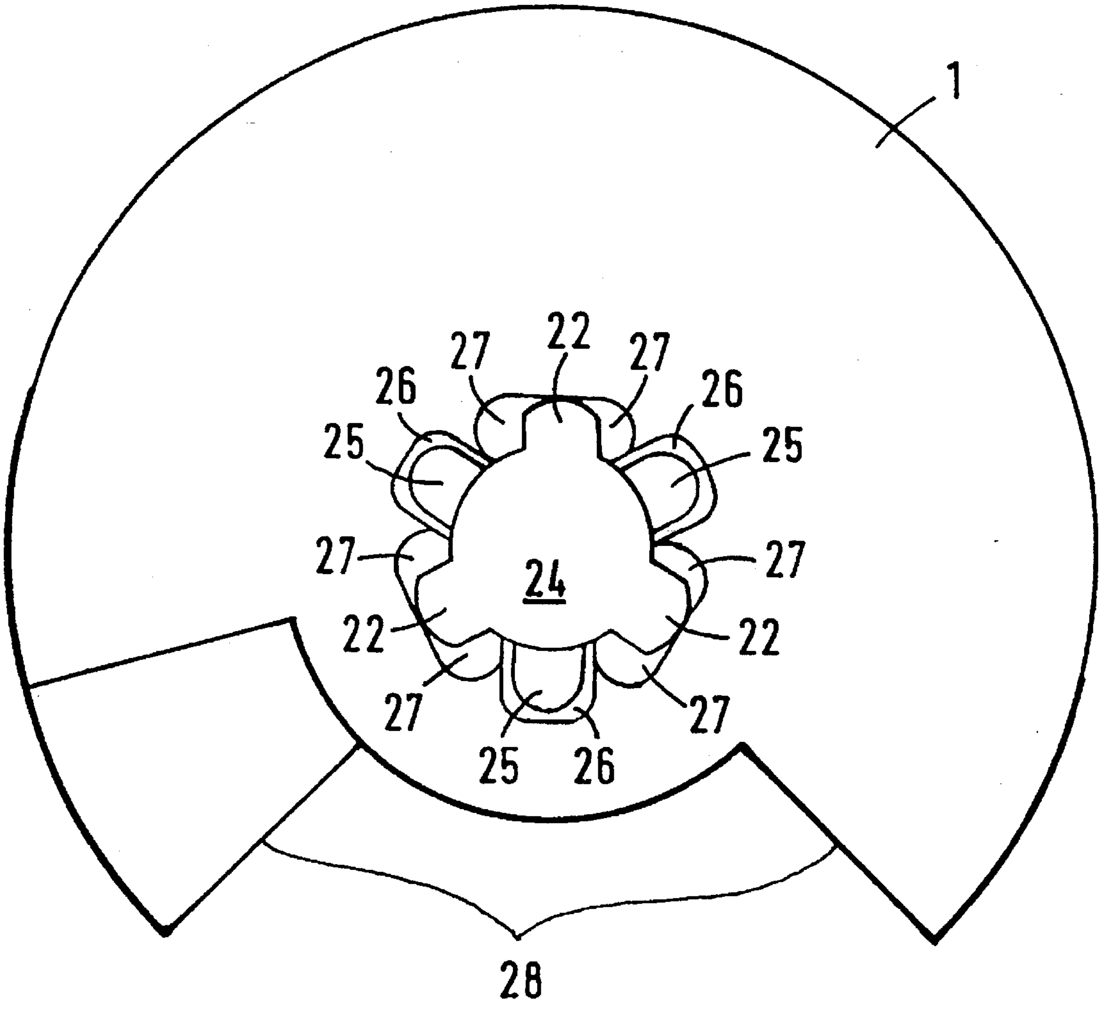
FIG. 8 is a top view of the first pressure plate 1.

Referring to the drawings in particular the invention as embodied therein in FIGS. 1 and 2 comprises a spring tightener having first and second pressure plates 1 and 2 which engage around a spring tightener tube assembly which includes a cylindrical guide tube 105, a coupling 113 which is telescopically movable in respect to the guide tube 105 and a threaded tube 103 which is internally threaded and engages in threadable connection with a spindle 104 which is journalled in a seat bushing 114. The first pressure plate 1 is positioned around the threaded tube 103 and bears against radially extending fingers 119 and the second pressure plate 2 rests on a shoulder or bearing surface 112 of the cylindrical guide tube 105 when the apparatus is arranged for engagement with a spring for tightening purposes.

The spring tightener shown in the drawing comprises two dishlike pressure plates 1 and 2, a cylindrical threaded tube 103, a threaded spindle 104 that can be screwed into the threaded tube 103, and a cylindrical guide tube 105 with a seat bushing 114. The threaded spindle 104 is mounted revolvingly in the seat bushing by means of an axial thrust bearing 106. The threaded tube 103 has an inner threading 107 at its lower terminal segment facing the axial thrust bearing 106, which extends over roughly a quarter of its total length.

As can be seen in FIG. 1, the pressure plate 2, which during use of the spring tightener lies on the ring-shaped, tilted bearing surface 112 of the guide tube 105 and is now in the vicinity of the spindle head, is provided with a central bore 21 as a insertion opening, the diameter of which is only slightly larger than the outer diameter of the guide tube 105, but smaller than the outer diameter of the bearing surface 112. The central bore 21, furthermore, is provided with three enlargements 20, each arranged at angular distances of 120° from each other, into which can be freely inserted three radial fingers 119, arranged in the shape of a star, i.e. arranged at spaced angular distances of 120°, at the upper end of the threaded tube 103 extending away from the spindle head. These radial fingers 119 are provided to produce a tension coupling between the pressure plate 1 and the threaded tube 103. The pressure plate 1 is also provided with a central insertion opening 24, which has a substantially cylindrical bore. As passages for the radial fingers 119, this insertion opening 24 has three axially continuous, radial enlargements or slots 22, similar to the central bore 21 of the pressure plate 2, whose angular distances from each other are also 120°. The width and radial extent of the openings 24 are each somewhat larger than the corresponding dimensions of the radial fingers 119. On the outside pressure plate 1, in the marginal region of the insertion opening 24, there are arranged axial recesses 23 with level plane bearing surfaces 25, each in the middle between two enlargements 22. The recesses 23 serve as a positive-locking, non-twisting seat for the radial fingers 119 of the threaded tube 103. To make sure that the radial fingers 119 cannot lodge anywhere else but the bearing surfaces 25 of the axial recesses 23, both the edges of the axial recesses 23 and the edges of the radial enlargements 22 on the outside are diagonally countersunk, so that conical slippage surfaces 26 and 27 are produced, which come together or intersect each other at least in the radial region of the radial fingers 119. Thus, in this region, there is no level plane bearing surface for the radial planes except the recesses 23. Moreover, the radial fingers 119 are basically wedge-shaped, so that they have only two options: either to slide into one of the recesses 23 or to slide into an axially continuous enlargement, when moved axially toward the pressure plate 1 from the outside.

Moreover, the two pressure plates 1 and 2 are essentially mirror images of each other. Both have the basic shape of a circular disc, with an annular segment cutout 28 extending through a 70°–90°, serving to let through a spring winding segment. The outer surfaces, facing away from each other, are smooth. On the inner surfaces, facing each other, annular surfaces wound in a shallow helix are provided inside an annular collar 29 extending about the outer periphery, each of which has a friction lining 31 in the form of a glued or vulcanized rubber band.

In this spring tightener, a guide tube portion 105 is provided with a seat bushing 114 at its lower end which has two diametrically opposite guide slots 115 and 116, closed at the upper end of the guide tube 105. The slots 115 and 116, as can best be seen in FIG. 2 and 6, terminate in an opening at an annular shoulder 117 of a cylindrical recess 118 in the seat bushing 114. The inner diameter of the recess 118 is at least equal to the outer diameter of the guide tube 105 above the seat bushing 114. The coupling tube 113 has integral guide cams 120, 121 formed at the end of the tube near a spindle 104. The cams 120 and 121 move with little lateral clearance in the guide slots 115 and 116, and their radial dimension is at least as large as the wall thickness of the guide tube 105, so that they cannot protrude out from the guide slots 115, 116. Both the guide tube 105 and a coupling tube 113 are entirely cylindrical, the outer diameter of the coupling tube 113 being so adjusted to the inner diameter of the guide tube 115 that a good telescoping movement between the two tubes is achieved.

The coupling tube 113 is inserted into the guide tube 105 as follows: The coupling tube 113 is pushed into the guide tube 105 from the bottom through a cylindrical recess or opening 118 of the seat bushing 114, so that the two guide slots 115, open at the bottom, receive the two guide cams 120 and 121. The coupling tube 113 is also provided with two diametrically opposite and axially extending guide slots 122, 123 except that these are closed at both the top and bottom end. In order to achieve the most compact possible design, the wall thicknesses of both the guide tube 105 and the coupling tube 113 are kept small. They amount to roughly 2–3 mm.

The threaded tube 103, which is subjected to tension and is provided with at least a terminal portion with inner threading 107 adjacent the end near the spindle head, has a larger wall thickness than the coupling tube and it is around 5–6 mm. This wall thickness of the threaded tube 103 is sufficient to secure two guide pins 124 and 125 therein, which are press-fitted into coaxial transverse bores 126 of the lower terminal segment of the threaded tube 103, provided with the inner threading 107. Each guide pin 126 and 127 is made of two rollpins of rolled spring steel plate, pressed together, which are driven into the transverse bores 126 and 127 through the guide slots 122 and 123. At most, the guide pins 126 and 127 can protrude beyond the circumference of the threaded tube 103 by the amount of the wall thickness of the coupling tube 113, but not beyond the guide slots 122, 123, thereby providing a non-twisting joint between the threaded tube 103 and the coupling tube 113. The length of the guide pins 124 and 125 is chosen such that, they do not engage with the inner threading 107 of the threaded tube 103 when they protrude beyond the circumference of the threaded tube 103 by the amount of the wall thickness of the coupling tube 113. This arrangement and the chosen length of the coupling pins 124 and 125 make it possible to knock these inward from the transverse bores 126 and 127 by means of a suitable driver when it is necessary to loosen the threaded tube 103 from the coupling tube 113 after the threaded spindle 104 is screwed out from the inner threading 107 by at least the distance shown in FIG. 2.

In the embodiment of the invention shown in FIGS. 2 and 3, the threaded spindle 104 is provided with an integral flange ring 108, which is seated on an axial bearing 106 and which is annexed by the key profile of the spindle head 109 as a single piece. So that the diameter both of the flange ring 108 and of the axial bearing 106 need not be chosen as large as the inner diameter of the recess 118 in the seat bushing 114, a cup-like cylindrical bearing shell 128 is inserted in the recess 118, being seated on the ring shoulder 117, and in which both the axial bearing 106 and the flange ring 108 are accommodated and secured by a safety ring 129 in the axial direction. The bearing shell 128, loosely seated in the recess 118 of the seat bushing 128, and which should be easy to insert and extract, is axially locked in this recess 118 by means of a safety ring 130. The two guide slots 115 and 116 of the guide tube 105 are closed by the bearing shell 128, so that the coupling tube 113 cannot be pushed out downwards when the bearing shell 128 is installed.

It is evident from FIG. 1, 2 and 3, that the coupling tube 113 and the threaded tube 103 move telescopically in each other, and that they can be pushed into the guide tube 105, until the inner front face 131 of the threaded tube 103 is seated on the bearing shell 128. In this position, the axial distance between the bearing surface 112 and the radial fingers 119 is approximately as large as the distance between the radial fingers 119 and the lower end face 131 of the threaded tube 103. This distance corresponds roughly to a third of the maximum distance between the bearing surface 112 and the radial fingers 119 a shown in FIG. 2, which distance is attained when the guide cams 120 and 121 are at the upper ends of the guide slots 115 and 116 and the guide pins 124 and 125 are at the upper ends of the guide slots 122 and 123, thus, when the threaded tube 103 is extended to the maximum.

In order to prevent an overtwisting of the threaded spindle and, hence, damage to the threading when the threaded tube 103 is in the extreme position relative to the guide tube 105, as shown in FIG. 2 and 3, there is provided a threaded spindle 104' as per FIG. 4, 5 and 6, whose key profile 109' is joined to it by a torque safety clutch The threaded spindle 104', accordingly, has a flange ring 108', which is provided with a locking toothed rim 132 at the outwardly directed end face, and outside the flange ring 108' with a cylindrical extension guide piece 133, grading into a threaded journal 134. The key profile head 109' is provided with a central bore 135, adjusted in diameter to the extension guide piece 133, and with a cylindrical recess 136 of enlarged diameter, which can be closed by a plastic cap 147. Furthermore, the key profile head 109' is provided with a counterlocking toothed rim 147, engaged and locked in the locking toothed rim 132, which is held in engagement by a stack of spring washers 138, arranged on the threaded journal 134 between a threaded nut 139 and the ring shoulder 140 of the recess 136. In the example of FIG. 4, the flange ring 108' and the axial bearing 106 have the same diameter as in the example of FIGS. 2 and 3, and they are accommodated in a bearing shell 128 in the same fashion. For safeguarding of the axial position of the flange ring 108', however a spacer bushing 141 is required, which bridges over an extension piece 142 of the key profile head 109' with enlarged diameter in the axial direction, so that the safety ring 129 can be easily installed and removed.

In the example of FIG. 5, in place of the bearing shell 128 there is provided only a bearing disc 143 with diameter suited to the recess 118, on which an axial bearing 106' is seated, against which a flange ring 108" is supported. Both the axial bearing 106' and the flange ring 108" in this case are adapted to the inner diameter of the recess 118, although this is not absolutely necessary. In order to allow a centered guidance of the threaded spindle 104' by a cylindrical extension piece 144 in the central bore 145 of the bearing disc 143, the flange ring 108" and the axial bearing 106', also guided on the cylindrical extension piece 144, do not require a guidance on the inner surface of the recess 118. Instead, in this case as well, a spacer bushing 146 is necessary to safeguard the axial position of the threaded spindle 104'. This spacer bushing 146 is seated on the flange ring 108" and is locked by the safety ring 130 in the recess 118. All other parts are in the identical arrangement as in the example of FIG. 4.

The provision of the above described torque safety clutch, which can be adjusted to various extreme values by means of the tension nut 139 and the stack of spring washers 138, assures that no overtwisting of the threaded spindle and hence no damage to the interlocking threads can result in either of the end positions of the threaded tube 103 relative to the guide tube 105, as shown in FIG. 2 and 3. If the key profile head 109' is twisted further in one of the two end positions of the threaded tube 103, the key profile head 109' will be twisted relative to the threaded spindle 104', while the two interlocking toothed rims 132 and 137 will mutually lock each other under the simultaneous axial displacement of the key profile head 109' and overcome the axial spring forces of the stack of spring washers 138. In order for this safety clutch to be effective in either direction of turn, the two locking toothed rims 132, 137 are provided with symmetrical tooth profiles.

In the described type of twist-protected connection between the guide tube 105 and the threaded tube 103, high strength is achieved even at slight wall thickness of both the guide tube 105 and the coupling tube 113, since in particular the guide cams 120, 121 of the coupling tube 113 are formed on the latter as integral pieces, i.e., they can be fashioned from the complete material, and in addition, the guide pins 124, 125 on the threaded tube have sufficient wall thickness for a stable press fit. The requirement for easy assembly and disassembly is also satisfied in an advantageous manner.

For reasons of stability, it is advisable to stagger the guide cams 120, 121 on the guide tube 105 with respect to the guide slots 122, 123 on the coupling tube 113 by, for example, 90°.

While specific embodiments of the invention have been shown and described in detail to illustrate the application of the principles of the invention, it will be understood that the invention may be embodied otherwise without departing from such principles.

What is claimed is:

1. A spring tightener for large coil springs, especially motor vehicle axle springs, comprising a cylindrical guide tube having axially spaced upper and lower ends, first and second axially spaced apart loose, disclike pressure plates, each pressure plate having a central insertion opening and first and second, opposite, surfaces, the first surface of each pressure plate constituting a spring engaging surface extending concentrically around the insertion opening, the second surface of said first pressure plate being formed with a plurality of circumferentially spaced radially extending recesses, the central insertion opening of said first pressure plate being radially enlarged at circumferentially spaced locations between circumferentially adjacent recesses a threaded spindle having a spindle head, the spindle head having a key profile, and an axial bearing rotatably supporting said spindle in said cylindrical guide tube with the spindle head adjacent the lower end, said guide tube being integrally formed at the lower end with a seat bushing providing a circumferential, radially outwardly extending bearing surface supporting said second pressure plate adjacent said spindle head with the spring engaging surface of the second pressure plate extending concentrically around said guide tube, said guide tube being provided with at least one axially extending guide slot which is closed at the upper end of said guide tube and which terminates in an open end in a recess of the seat bushing at the lower end of said guide tube, said recess having a minimum inner diameter which is at least equal to the maximum diameter of the guide tube above said seat bushing enabling the guide tube to be inserted axially therethrough to assemble the spring tightener, said axial bearing being located within said recess of said seat bushing, a cylindrical, interiorly threaded, tube threadably engaged with said spindle and having an upper end portion with radially outwardly extending, angularly spaced, fingers arranged around its periphery the upper end portion of the threaded tube being insertable in an axial direction through the central insertion opening of said first pressure plates when the fingers are in a first angular position in which they pass freely through the radial enlargements of the central insertion opening and the upper end portion being then twistable about its axis to rotate the fingers to a second angular position in which the fingers are engageable in the recesses of said first pressure plate enabling a non-twisting coupling between said threaded tube and said first pressure plate when the spring tightener is assembled with a spring to be tightened trapped in compressed condition extending concentrically around the tubes by engagement with the spring engaging surfaces of respective, pressure plates so that the spring urges the fingers and recesses relatively together into engagement, a cylindrical coupling tube having axially spaced upper and lower ends and being integrally formed, at its lower end, with at least one integral guide cam guided in said guide slot of said guide tube interconnecting the coupling tube and the guide tube for relative, non-twisting axial telescopic sliding movement with the coupling tube in sliding engagement within said guide tube, the coupling tube also having at least one axially extending coupling tube guide slot closed adjacent each axial end of said coupling tube, a guide pin secured to said threaded tube and guided in said coupling tube guide slot, whereby axial, telescopic, non-twisting movement of the threaded tube and coupling tube towards the lower end of the guide tube with the threaded tube in sliding engagement within the coupling tube is permitted by rotation of the spindle to draw the first and second pressure plates towards each other thereby compressing a spring located therebetween.

2. A spring tightener according to claim 1, wherein said guide tube and said coupling tube each have two diametrically opposite guide slots, said coupling tube being provided with two diametrically opposite guide cams and said threaded tube having two diametrically opposite guide pins.

3. A spring tightener according to claim 2, wherein said guide pins are secured to said threaded tube by positive locking but are detachable.

4. A spring tightener according to claim 3, wherein said guide pins comprise two mutually bracing roll pins which are press fitted into radial bores of said threaded tube.

5. A spring tightener according to claim 3, wherein said guide pins are shorter than the inner diameter of said threaded tube.

6. A spring tightener according to claim 1, including a cylindrical bearing shell, said spindle having a lower flange than engaged in said cylindrical bearing shell, a key profile head having a cylindrical portion journalled in said cylindrical bearing shell below said flange of said spindle.

7. A spring tightener according to claim 1 wherein said open end of said at least one axially extending guide slot is closed by a bearing shell seated on a ring shoulder of said seat bushing, said guide tube having a thickness and said bearing shell having a radial width which correspond to each other.

8. A coil spring tightener arrangement, comprising:

a cylindrical guide tube;

a cylindrical coupling tube which is telescopically movable within said guide tube;

a threaded tube with an internal threaded portion, said threaded tube being telescopically movable within said cylindrical coupling;

a seat bushing provided in said cylindrical guide tube at a base portion thereof;

a threaded spindle having a base end mounted revolvingly in said seat bushing by means of axial thrust bearings, said threaded spindle engaging the threaded portion of said threaded tube;

a tilted bearing surface formed about the periphery of said cylindrical guide tube adjacent said base portion;

a guide slot formed in said guide tube extending substantially vertically from a lower stop end adjacent said tilted bearing surface to an upper stop end spaced from a top end of said cylindrical guide tube;

a guide cam integrally connected to a base end of said cylindrical coupling tube and extending within said guide slot for guided movement between said lower stop end and said upper stop end;

a coupling tube guide slot extending substantially vertically from a coupling tube lower stop end adjacent a base end of said coupling tube to a coupling tube upper slot end adjacent a top end of said coupling tube;

a threaded tube guide cam connected to a base end of said threaded tube and extending within said coupling tube guide slot for guided movement between said coupling tube lower stop end and said coupling tube upper stop end;

an upper pressure plate;

upper pressure plate connection means connected to an upper end of said threaded tube, for engaging said upper pressure plate to fix said upper pressure plate to said threaded tube; and a lower pressure plate having an opening with a dimension larger than a maximum width dimension of each of said threaded tube upper pressure plate connection means, coupling tube and guide tube and having a surface for engagement with said tilted bearing surface.

9. A coil spring tightener arrangement according to claim 8 wherein the lower stop end of the guide slot opens into a recess formed by the base portion of the guide tube and is closed by the seat bushing means received in the base portion whereby the coupling tube can be assembled in telescopic engagement in the guide tube by insertion through the recess.

10. A coil spring tightener arrangement of the type which is mounted concentrically within a coil spring to be tightened and applies concentric tightening forces thereto comprising:

a cylindrical guide tube having an upper portion opening to a base portion of increased internal and external diameter forming an outwardly facing radially outwardly extending bearing surface about the periphery of said cylindrical guide tube at the junction of the upper and base portions and providing a seat bushing receiving recess open at a lower end;

a guide slot formed in said guide tube extending substantially axially downwardly from an upper closed, end spaced from a top end of said cylindrical guide tube to a lower insertion end adjacent said bearing surface and opening into the seat bushing receiving recess;

seat bushing means provided in said base portion of said cylindrical guide tube;

a cylindrical coupling tube which is mounted for telescopic sliding movement within said guide tube;

a threaded tube with an internal thread portion, said threaded tube being mounted for telescopic sliding movement within said cylindrical coupling tube;

a threaded spindle having a base end mounted rotatively in said seat bushing means by an axial thrust bearing, said threaded spindle engaging the threaded portion of said threaded tube;

a guide cam integrally formed with the base end of said cylindrical coupling tube and extending radially outwardly therefrom into said guide slot for guided movement between said lower insertion end and said upper closed end;

a coupling tube guide slot extending substantially vertically downwardly from a coupling tube upper closed slot end adjacent a top end of said coupling tube to a lower closed slot end adjacent a base end of said coupling tube;

a threaded tube guide cam connected to a base end of said threaded tube and extending within said coupling tube guide slot for guided movement between the coupling tube slot upper and lower ends;

an upper pressure plate;

upper pressure plate connection means connected to an upper end of said threaded tube, for engaging said upper pressure plate to fix said upper pressure plate to said threaded tube;

and a lower pressure plate having an opening with a dimension larger than a maximum width dimension of each of said threaded tube upper pressure plate connection means, coupling tube and guide tube and having a surface for engagement with said bearing surface;

the internal diameter of the bushing receiving recess defined by the base portion being greater than the maximum diameter of the coupling tube including the cam whereby the coupling tube can be inserted axially through an open bottom end of the base portion of the guide tube with the cam inserted into the open lower insertion end of the guide slot so as to assemble the coupling tube within the guide tube for telescopic movement with outer and inner wall surfaces of the coupling tube and guide tube, respectively, in sliding engagement, the insertion end of the guide slot being subsequently closed by receipt of the seat bushing means in the base portion.

* * * * *